United States Patent
Saitoh

(10) Patent No.: US 7,315,410 B2
(45) Date of Patent: Jan. 1, 2008

(54) SCANNER ELEMENT HAVING A CONSTANT RESONANCE FREQUENCY, AND OPTICAL SCANNING APPARATUS AND IMAGE FORMING APPARATUS USING SUCH A SCANNER ELEMENT

(75) Inventor: Tetsurou Saitoh, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 207 days.

(21) Appl. No.: 11/282,655

(22) Filed: Nov. 21, 2005

(65) Prior Publication Data

US 2006/0132883 A1    Jun. 22, 2006

(30) Foreign Application Priority Data

Nov. 25, 2004  (JP) .............................. 2004-340129
Sep. 15, 2005  (JP) .............................. 2005-269244

(51) Int. Cl.
G02B 26/08    (2006.01)
(52) U.S. Cl. .................... 359/224; 347/233; 248/608
(58) Field of Classification Search ................ None
See application file for complete search history.

(56) References Cited

U.S. PATENT DOCUMENTS

| | | | |
|---|---|---|---|
| 4,897,846 A | 1/1990 | Yoshida et al. | |
| 5,631,474 A | 5/1997 | Saitoh | |
| 6,476,551 B1 | 11/2002 | Osawa et al. | |
| 6,577,332 B2 | 6/2003 | Osawa et al. | |
| 6,657,765 B2 | 12/2003 | Hayashi et al. | |
| 6,686,946 B2 | 2/2004 | Masuda et al. | |
| 2002/0122217 A1 | 9/2002 | Nakajima | |
| 2002/0171878 A1 | 11/2002 | Nakajima | |
| 2003/0053156 A1 | 3/2003 | Satoh et al. | |
| 2003/0227538 A1 | 12/2003 | Fujii et al. | |
| 2004/0036936 A1 | 2/2004 | Nakajima et al. | |
| 2004/0263937 A1 | 12/2004 | Fujii et al. | |
| 2005/0030606 A1 | 2/2005 | Nakajima | |
| 2005/0243396 A1 | 11/2005 | Fujii et al. | |
| 2006/0028533 A1* | 2/2006 | Nakajima .................... 347/233 |

FOREIGN PATENT DOCUMENTS

| | | |
|---|---|---|
| JP | 2002-40353 | 2/2002 |
| JP | 2002-40355 | 2/2002 |
| JP | 2003-84226 | 3/2003 |

* cited by examiner

*Primary Examiner*—James Phan
(74) *Attorney, Agent, or Firm*—Oblon, Spivak, McClelland, Maier & Neustadt, P.C.

(57) ABSTRACT

A scanner element includes a frame part formed by a substrate, a movable plate formed inside the frame part and a torsion bar swingably supporting the movable plate on the frame part. One of the movable plate and the torsion bar has an adjusting part formed by a process of forming the movable plate and the torsion bar so that a ratio of an actual value of a moment of inertia $I+\Delta I$ of the movable plate to an actual value of a spring constant $K+\Delta K$ of the torsion bar is substantially equal to a ratio of a design value of the moment of inertia $I$ of the movable plate to a design value of the spring constant $K$ of the torsion bar.

16 Claims, 16 Drawing Sheets

SCANNER ELEMENT HAVING A CONSTANT RESONANCE FREQUENCY, AND OPTICAL SCANNING APPARATUS AND IMAGE FORMING APPARATUS USING SUCH A SCANNER ELEMENT

BACKGROUND OF THE INVENTION

1. Field of the Invention

The present invention generally relates to scanner elements and, more particularly, to a scanner element that deflects an optical beam by swinging a micro mirror, and an optical scanning apparatus and an image forming apparatus using an optical writing apparatus used for scanning an exposure light according to electrophotography.

2. Description of the Related Art

In recent years, an optical scanning apparatus, which scans an optical beam such as a laser light, is used in optical equipments such as a barcode reader, a laser printer, a head mount display, etc. As an optical scanner of this type, there is suggested an apparatus having a structure in which a micro mirror, which is formed by using a micro-machining technique, is swung.

FIGS. 1A through 1C show an optical scanner having a micro mirror which is formed by using a micro-machining technique. FIG. 1A is a perspective view of the optical scanner; FIG. 1B is a cross-sectional view of the optical scanner; and FIG. 1C is a plan view of the optical scanner. The optical scanner 10 comprises a substrate 2, which is formed by a dual layer substrate of SOI that is formed of two sheets of conductive silicon substrates 200 and 201 being applied to each other via an insulative silicon oxide film 202. A mirror 1 as a movable plate is supported using elastic members (torsion bars) 3 which serve as beams provided along a straight line. Movable electrodes 8 are provided in the mirror 1. Stationary electrodes 9 are provided in a frame part 5 so as to face the movable electrodes 8, respectively. The movable electrodes 8 and the stationary electrodes 9 are separated from each other by separation grooves 6. Additionally, bonding pads 4 for the stationary electrode 9 and bonding pads 7 for the movable electrodes 8 are connected to the stationary electrodes 9 and the movable electrodes 8, respectively, via the conductive silicon substrate 200. The optical scanner 10 causes the micro mirror 1 to reciprocally swing using the two elastic members 3 as a torsional rotation axis according to an electrostatic attraction force between the movable electrodes 8 and the stationary electrodes 9.

As a method of forming the above-mentioned micro mirror, forming a resist film on one side of the dual layer substrate of SOI using spin coating; thereafter, developing and fixing the resist film by using a photo mask to form the frame part 5, the micro mirror 1, the elastic members 3, the movable electrodes 8, the stationary electrodes 9 and the separation grooves 6 according to a photolithography; and etching the pattern to the silicon oxide film according to a dry-etching method using the patternized resist film.

Subsequently, a resist film is formed on an opposite side of the SOI substrate in the same manner, the resist film is patternized using a photo mask to left the frame part 5 and the stationary electrodes 9, and, thereafter, parts excluding the frame part 5 and the stationary electrodes 9 are etched to the surface of the silicon oxide film surface. Thereafter, the exposed parts of the silicon oxide film are removed by etching and the bonding pads 4 and 7 are formed on predetermined positions.

FIG. 2 is a perspective view of the optical scanner 10 and a stem 12 to which the optical scanner 10 is mounted. A counter-sink part 11 is formed in the stem 12 so that the swing of the micro mirror 1 is not prevented. FIG. 3 is a perspective view of the assembly of the optical scanner 10 and the stem 12.

Moreover, there is suggested a structure as an example of the optical scanning apparatus using the above-mentioned micro mirror in which a plurality of optical scanners are provided. FIG. 4 is an illustration of the optical scanning apparatus provided with a plurality of optical scanners. A plurality of optical scanners 102 are provided on a base 101. A drive device 103 supplies a drive current to each optical scanner 102. Laser light sources 104 are provided to the respective optical scanners 102. Laser beams emitted by the laser light sources 104 are reflected by the respective mirrors of the optical scanners 102 so that reflected laser beams 105 are obtained.

Moreover, the following laser printer is suggested as an image forming apparatus using the above-mentioned optical scanning apparatus. FIG. 5 is an illustration of a laser printer as an example of an image forming apparatus. The laser printer 106 as an image forming apparatus comprises: an optical scanning apparatus 107 having the above-mentioned structure; a photoconductor 108 on which a latent image is formed by a reflected laser beam which is deflected by a mirror of the optical scanning apparatus 107; a developer 109 for developing the electrostatic latent image formed on the photoconductor 108 to a toner image; a transfer unit 110 for transferring the toner image on the photoconductor 108 to a recording medium; a recording medium supplier 111 for supplying the recording medium to an image forming part; and a fixation unit 112 for fixing the toner image on the recording medium.

FIG. 6 is an illustration of the optical scanning apparatus 107 and the photoconductor 108 shown in FIG. 5. A plurality of optical scanners are arranged in a main scanning direction. The laser light sources 104 emit laser beams according to image signals generated by an image signal generating apparatus (not shown in the figure). The laser beams irradiated by the laser light sources 104 incident on the optical scanning apparatuses 107. The reflected laser beams 105 that are deflected by mirrors in the optical scanning apparatus 107 form a latent image on the photoconductor 108.

In the above-mentioned image forming apparatus, a variation in the resonance frequency of the optical scanners constituting the optical scanning apparatus may cause a problem. FIG. 7 is a graph showing results of the resonance frequency f0 of each optical scanner. Each optical scanner has its own resonance frequency f0 as shown in FIG. 7. The variation in the resonance frequency f0 occurs due to the following cause.

FIG. 8A is a perspective view of an optical scanner of which structure is simplified for the sake of easy description of the resonance frequency of the optical scanner. FIG. 8B is a cross-sectional view of the optical scanner shown in FIG. 8A. The optical scanner comprises: a mirror 1 supported by two elastic members 3 as beams provided along a straight line that provide a rotational axis; a movable electrode 8 provided in the mirror 1; and a stationary electrode 9 provided in a frame member 5 so as to face the movable electrode 8. The mirror 1 is reciprocally swung by an electrostatic attraction force between the movable electrode 8 and the stationary electrode 9 using the two elastic members 3 as a torsional rotation axis. In this optical scanner, the resonance frequency of the mirror 1 is given by the following equation (1).

$$f0 = \frac{1}{2\pi}\sqrt{(K/I)} \qquad (1)$$

where I represents a moment of inertia of the mirror, and K represents a spring constant determined by the two elastic members (torsion bars).

As mentioned above, in order to form the above-mentioned small size mirror (micro mirror), it is generally performed to form an etching mask by photolithography so as to form the shape of the mirror and other parts by using etching using the etching mask. However, in the process of forming the mirror, a transfer variation and over-etching or under-etching may occur. The transfer variation occurs due to the resist pattern being larger or smaller relative to the photo mask pattern in an exposure and development process of the photo mask pattern. The over-etching or under-etching occurs due to an object to be processed by etching being larger or smaller relative to the resist pattern.

Thus, there is a variation occurring in the accuracy of processing the elastic members 3. Due to the processing error, the shape of the torsion bars may vary with respect to an originally designed shape, which results in a variation in the spring constant K of the torsion bars. Additionally, the shape of the mirror also varies due to the same processing error with respect to the designed shape, which causes a variation in the moment of inertia of the mirror.

Therefore, a variation may occur in the value of the resonance frequency f0 represented by the equation (1). In the optical scanning apparatus having a plurality of optical scanners, if there is a variation in the resonance frequency f0 among the mirrors of the optical scanners, a variation occurs in a swing angle of the mirrors shown in FIG. 8B.

FIG. 9 is a graph showing a relationship between variation in etching and the resonance frequency. The optical scanner used for measurement has a weight of about 1.5 mg and a moment of inertia of $2.3\times10^{-5}$ erg·cm. The torsion bar has a cross-section of 0.09 mm×0.2 mm and a length of 2 mm. FIG. 9 shows a fluctuation in the resonance frequency due to a variation in etching when processing the optical scanner. It can be appreciated from the graph of FIG. 9 that a variation in etching of ±2 μm with respect to a design value causes the fluctuation in the resonance frequency of 140 Hz.

Therefore, in an image forming apparatus using the above-mentioned optical scanner, a connection part between images formed by adjacent optical scanners is visible, which causes a problem that an image quality is deteriorated. Thus, there has been suggested a method of adjusting a resonance frequency of an optical scanner.

FIG. 10 is a perspective view of an optical scanner which is capable of adjusting a resonance frequency thereof according to a first method (for example, refer to Patent Document 1). In the first method, a planer type galvanometer mirror having a movable plate provided with mass-loading parts 13 and 14 on opposite ends thereof is operated and a difference between an initial resonance frequency and a previously set target resonance frequency is read. Then, a number of pulses of a laser light to be irradiated is calculated in accordance with the difference, and the thus-determined laser light is irradiated onto the mass-loading parts 13 and 14 so as to reduce the mass of the galvanometer mirror to adjust the resonance frequency to the target value.

FIG. 11 is a perspective view of an optical scanner showing a second method of adjusting a resonance frequency (for example, refer to Patent Document 2). In the second method, comb-shaped parts 18 are provided at corners of the mirror 1 so as to adjust a moment of inertial of the mirror. A laser beam 15 of a $CO_2$ laser deflected by a deflection mirror 16 is irradiated onto a root of one of the comb-shaped parts 18 so as to cut off the one of the comb-shaped parts 18. Each of the comb-shaped parts 18 has a small mass relative to the mirror 1, and, thus, a moment of inertia of the mirror is reduced in response to a number of the comb-shaped parts 18 that are removed from the mirror. Accordingly, a quantitative adjustment of the resonance frequency of the mirror can be made.

Furthermore, there is a third method of adjusting a resonance frequency by controlling an amount of deposition of metal to a mirror or an amount of etching of the mirror in a manufacturing process of the galvanometer mirror (for example, refer to Patent Document 3).

[Patent Document 1] Japanese Laid-Open Patent Application No. 2002-40355

[Patent Document 2] Japanese Laid-Open Patent Application No. 2003-84226

[Patent Document 3] Japanese Laid-Open Patent Application No. 2002-40353

According to the above-mentioned first and second methods, a high-power laser apparatus is needed to adjust the frequency of the mirror, which causes a problem in that a manufacturing cost is increased. Additionally, there is a problem in that substances scattered by laser irradiation may adhere to a surface of the mirror, which causes a pollution of the mirror. Further, since a high-power laser is irradiated in the vicinity of the mirror surface, it is difficult to prevent temperature rise of the mirror component. A local temperature rise in the mirror component may cause distortion of the mirror component. Additionally, since frequency adjusting process must be performed on an individual device basis, a number of processes is increased, which results in an increase in a manufacturing cost.

On the other hand, according to metal vapor deposition of the etching according to the above-mentioned third method, it is difficult to control a distribution of an amount of vapor deposition or an amount of etching in a semiconductor wafer when a plurality of galvanometer mirror (optical scanner) are formed on the semiconductor wafer by using a semiconductor manufacturing technology. Thus, it is difficult to optimize the resonance frequency of each of the galvanometer mirrors on the semiconductor wafer.

SUMMARY OF THE INVENTION

It is a general object of the present invention to provide an improved and useful scanner element in which the above-mentioned problems are eliminated.

A more specific object of the present invention is to provide a scanner element, an optical scanning apparatus and an image forming apparatus which can suppress a fluctuation in a resonance frequency of a mirror that is caused by a variation in processing accuracy of components of the optical scanning apparatus so as to achieve a constant swing angle of the mirror.

In order to achieve the above-mentioned objects, there is provided according to one aspect of the present invention a scanner element comprising: a frame part formed by a substrate; a movable plate formed inside the frame part; and a torsion bar swingably supporting the movable plate on the frame part, wherein one of the movable plate and the torsion bar has an adjusting part formed by a process of forming the movable plate and the torsion bar so that a ratio of an actual value of a moment of inertia I+ΔI of the movable plate to an actual value of a spring constant K+ΔK of the torsion bar is substantially equal to a ratio of a design value of the moment of inertia I of the movable plate to a design value of the spring constant K of the torsion bar.

According to the present invention, when the actual moment of inertia and the actual spring constant are varied from their design values due to tolerance of processing the movable plate and the torsion bar, the ratio of the actual moment of inertia of the movable plate to the actual spring constant of the torsion bar is automatically maintained unchanged. Thus, a resonance frequency of the movable plate is prevented from fluctuating, which results in a good quality image formation.

In the above-mentioned scanner element, the adjusting part may be formed in the movable plate so as to serve as a moment of inertia adjusting mechanism that adjusts the amount of change $\Delta I$ in the moment of inertia $I$, when an amount of processing the substrate to form the movable plate and the torsion bar varies, so that the amount of change $\Delta I$ in the moment of inertia $I$ is equal to $(\Delta K/K)I$ when the design value of the spring constant $K$ of the torsion bar changes by the amount of change $\Delta K$ due to a variation in the amount of the processing. Accordingly, even if the actual spring constant of the torsion bar varies from the design value, the resonance frequency is prevented from fluctuating.

Additionally, in the above-mentioned scanner element, the moment of inertia adjusting mechanism includes a plurality of structural elements located at positions in a part other than parts providing a function of the movable plate so that the moment of inertia of the movable plate changes in response to a variation in an amount of processing of the movable plate. Accordingly, the structural elements can be provided on the periphery of the movable plate, which serves as the moment of inertia adjusting mechanism, which permits a frequency adjustment of the scanner element without deteriorating the function of the movable plate of the scanner element.

Additionally, in the above-mentioned scanner element, n pieces of the structural elements may be provided in or near the movable plate, and an amount of change of a moment of inertia of each of the structural elements in the processing step of the structural elements is $\Delta I(i)$, where i is an integer from 1 through n so that a relationship $\Delta I(1)+\Delta I(2)+ \ldots +\Delta I(n)=(\Delta K/K)I$ is satisfied. Accordingly, the structural elements as a whole serve as the moment of inertia adjusting mechanism to correct the moment of inertia as if the spring constant is corrected, which permits a frequency adjustment of the scanner element without deteriorating the function of the movable plate of the scanner element.

Additionally, in the scanner element according to the present invention, the adjusting part may be formed in the torsion bar so as to serve as a spring constant adjusting mechanism that adjusts the amount of change $\Delta K$ in the spring constant $K$ of the torsion bar when an amount of processing to from the movable plate and the torsion bar varies, so that the amount of change $\Delta K$ in the spring constant $K$ is equal to $(\Delta I/I)K$ when a designed value of the moment of inertia $I$ of the movable plate changes by the amount of change $\Delta I$ due to a variation in the amount of the processing. Accordingly, if the actual moment of inertia of the movable plate varies form the design value, the resonance frequency prevented from fluctuating without deteriorating the function of the movable plate of the scanner element.

Additionally, in the scanner element according to the present invention, the movable plate and the torsion bar may be processed by the same processing step. Accordingly, the same tolerance of processing is given to both the movable plate and the torsion bar, which enables to maintain the relationship $K/I=(K+\Delta K)/(I+\Delta I)$.

Additionally, the processing step may be an etching process. The amount of change $\Delta I$ of the moment of inertia $I$ of the movable plate may correspond to a tolerance of the amount of processing the movable plate due to over-etching or under-etching. The amount of change $\Delta K$ of the spring constant $K$ of the torsion bar may correspond to a tolerance of the amount of processing the torsion bar due to over-etching or under-etching. Accordingly, the same tolerance of etching process is given to both the movable plate and the torsion bar, which enables to maintain the relationship $K/I=(K+\Delta K)/(I+\Delta I)$.

In the above-mentioned scanner element, the moment of inertia adjusting mechanism may include a concavo-convex shape provided on a periphery of the movable plate. Alternatively, the moment of inertia adjusting mechanism may include a recess or a through opening provided in the movable plate. Accordingly, the resonance frequency can be adjusted by the moment of inertia adjusting mechanism having a simple structure.

Additionally in the above-mentioned scanner element, the movable plate may have a concavo-convex shape on a periphery thereof. Alternatively, the movable plate may have a recess or a through opening provided inside thereof. Accordingly, the concavo-convex shape or the recess or the through opening an area where a variation in the processing the movable plate is given can be adjusted, which makes easy control of the moment of inertial of the movable plate due to a variation in processing the movable plate.

Additionally, there is provided according to another aspect of the present invention an optical scanning apparatus comprising a light source and the above-mentioned scanner element. Accordingly, since the scanner element is capable of performing a swinging operation of the mirror with good controllability, thereby enabling a scanning of a light with good controllability.

Further, there is provided according to another aspect of the present invention an image forming apparatus comprising: the above-mentioned optical scanning apparatus that scans a light; a photo conductor that forms an electrostatic latent image thereon according to the light from the optical scanning apparatus; and a developer that develops the electrostatic latent image by a toner to form a toner image; and a transfer unit that transfer the toner image onto a recording medium. A plurality of the optical scanning apparatuses may be provided, and wherein the amount of change $\Delta I$ of the moment of inertia $I$ of the movable plate may correspond to a tolerance of the amount of processing the movable plate due to over-etching or under-etching. Accordingly, the image forming apparatus can perform a scan of a light with good controllability, which enables an output of a high-quality image.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments of the present invention.

First Embodiment

Figure 1A:
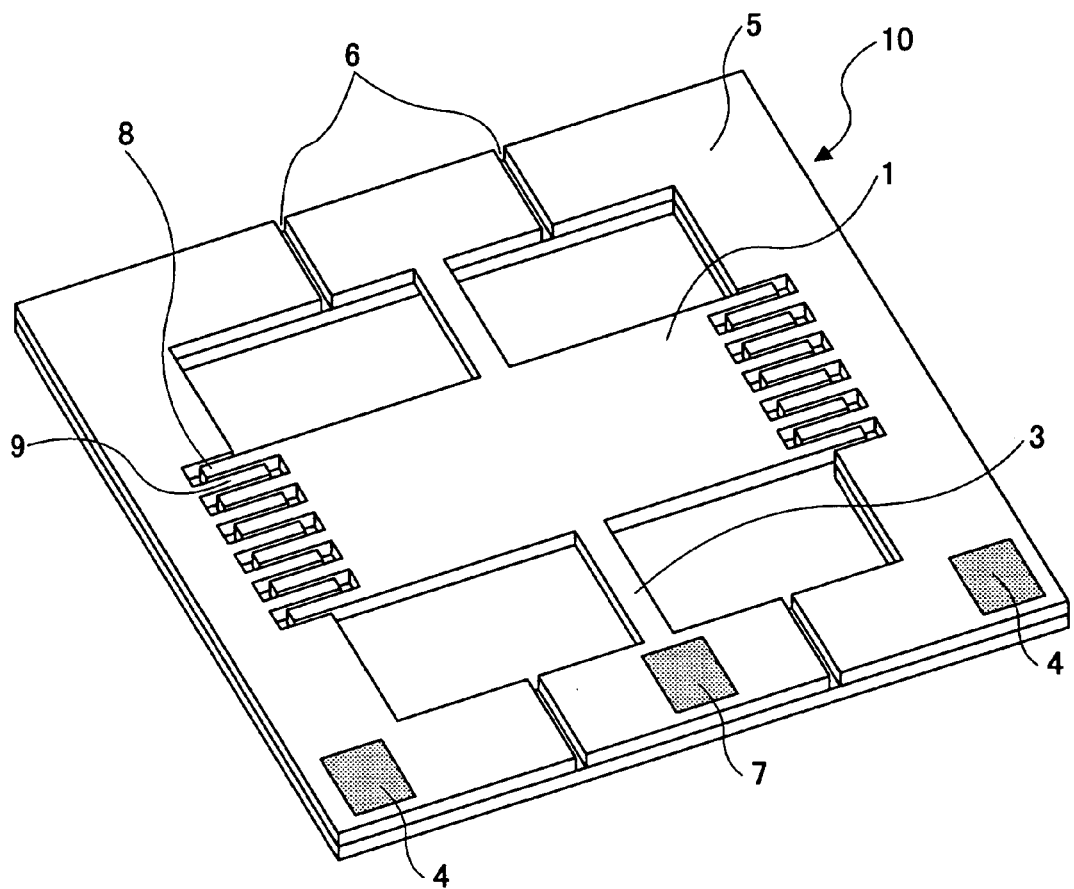
FIG. 1A is a perspective view of an optical scanner.
Figure 1B:
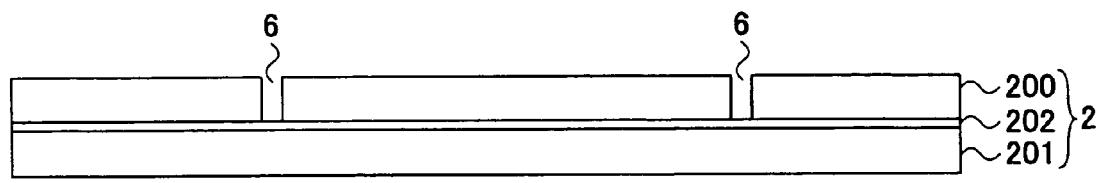
FIG. 1B is a cross-sectional view of the optical scanner.
Figure 1C:
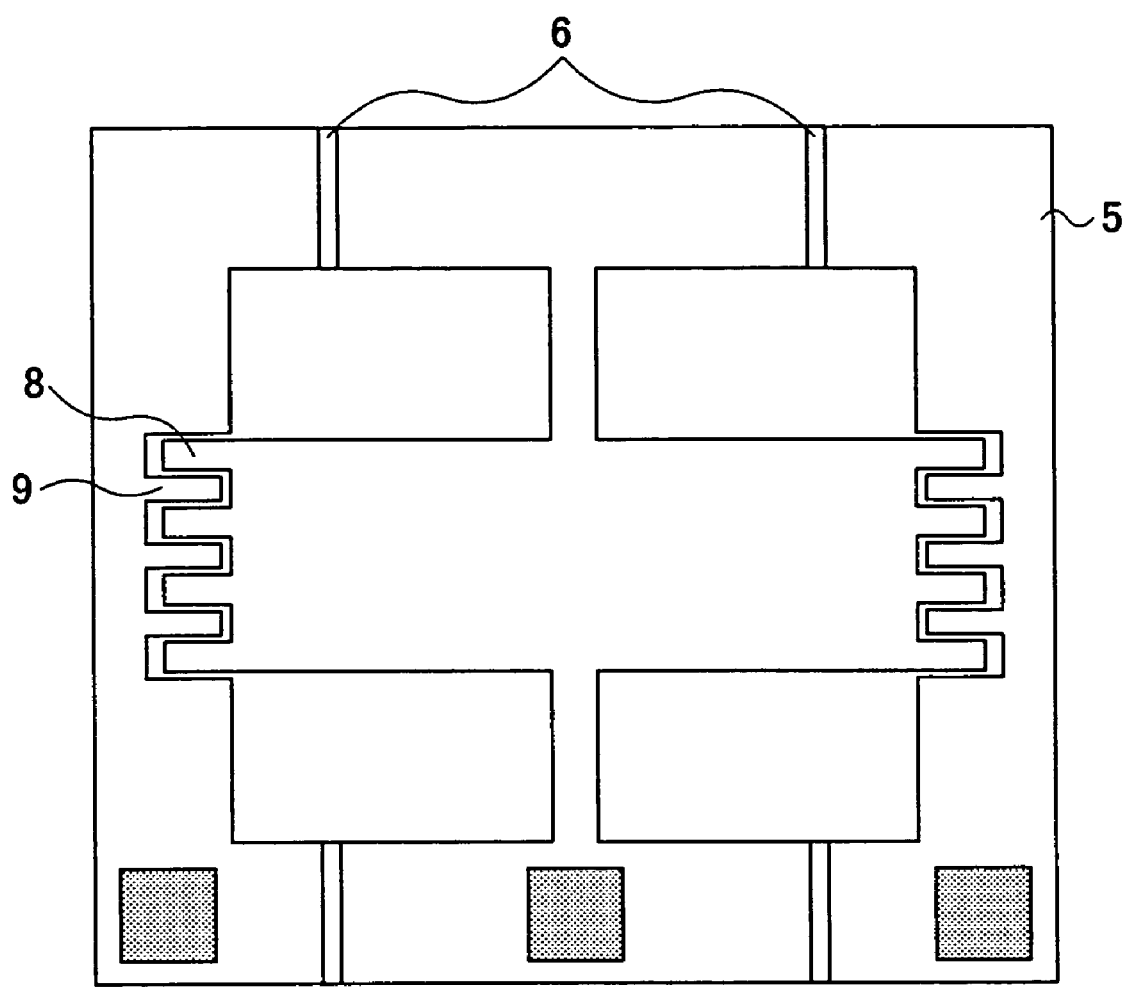
FIG. 1C is a plan view of the optical scanner.
Figure 2:
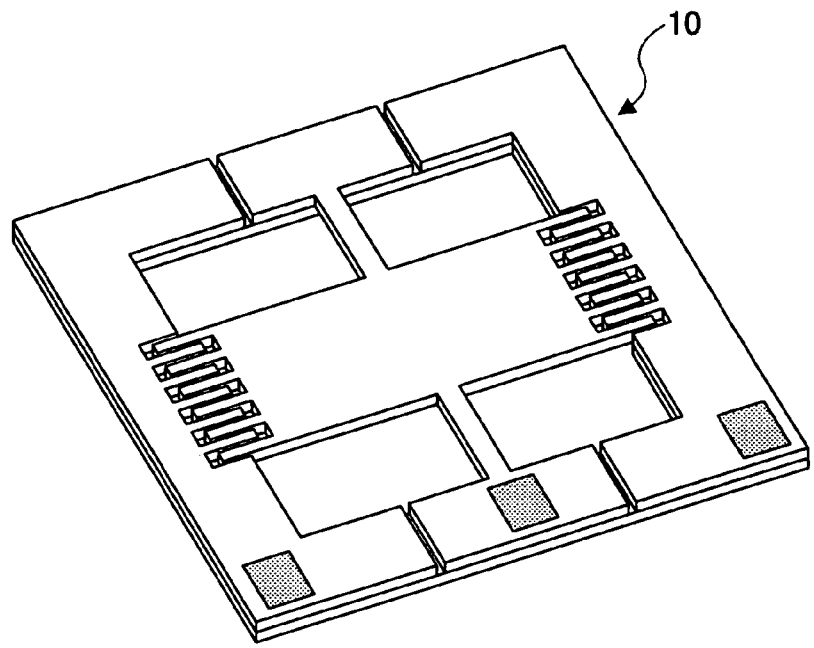
FIG. 2 is a perspective view of the optical scanner and a stem 12 to which the optical scanner is mounted.
Figure 2:
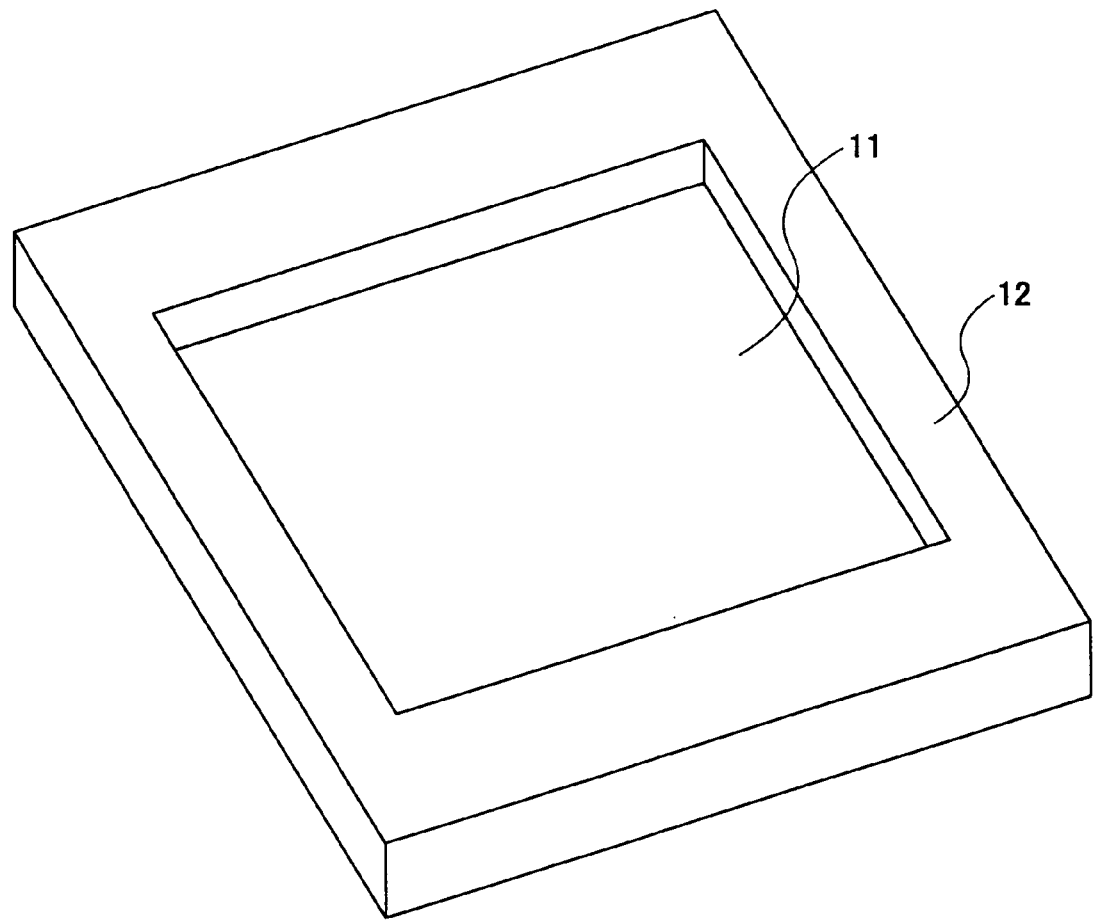
Figure 3:
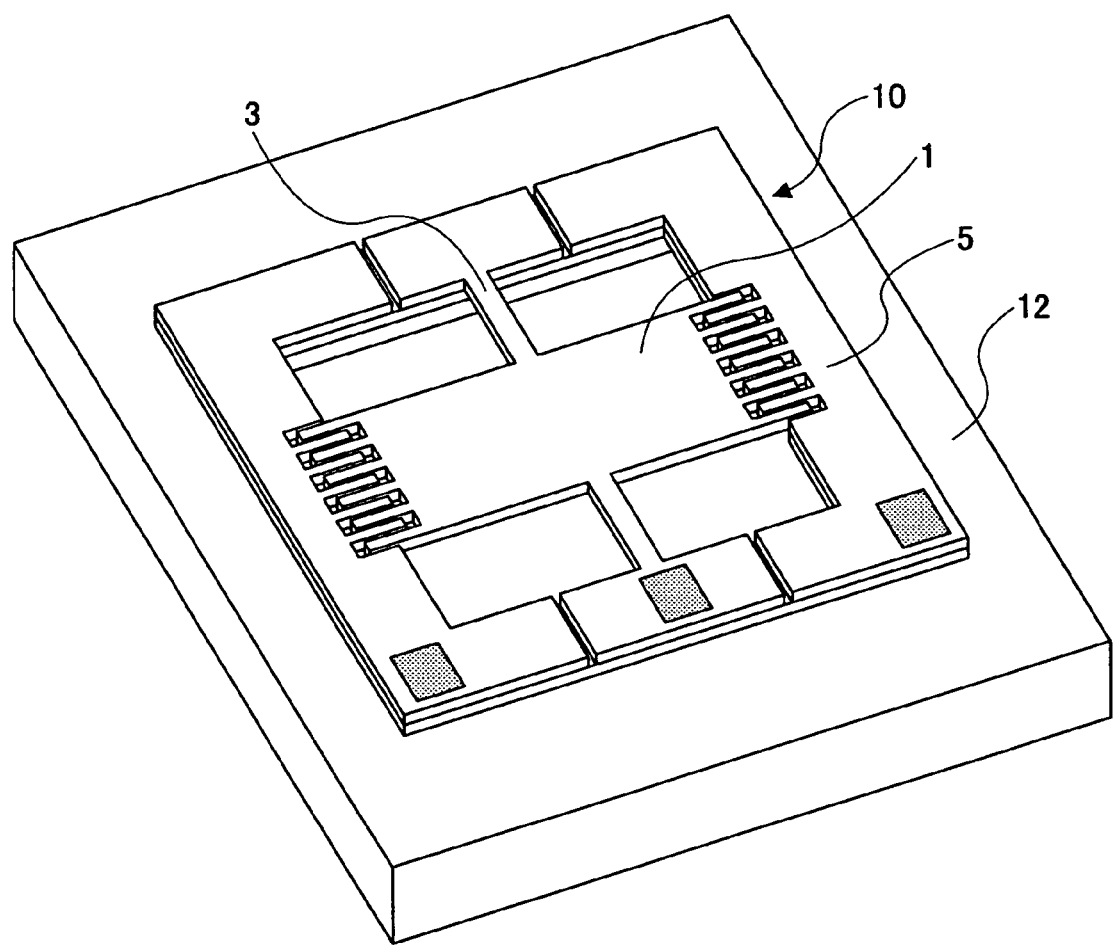
FIG. 3 is a perspective view of an assembly of the optical scanner and the stem.
Figure 12A:
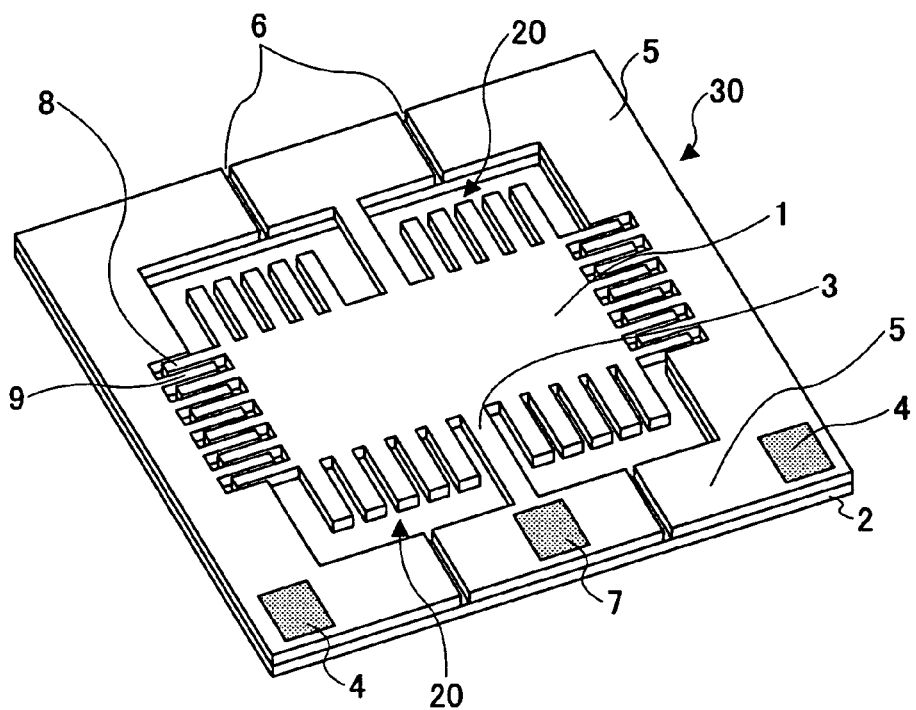
FIG. 12A is a perspective view of an optical scanner element according to a first embodiment of the present invention.
Figure 12B:
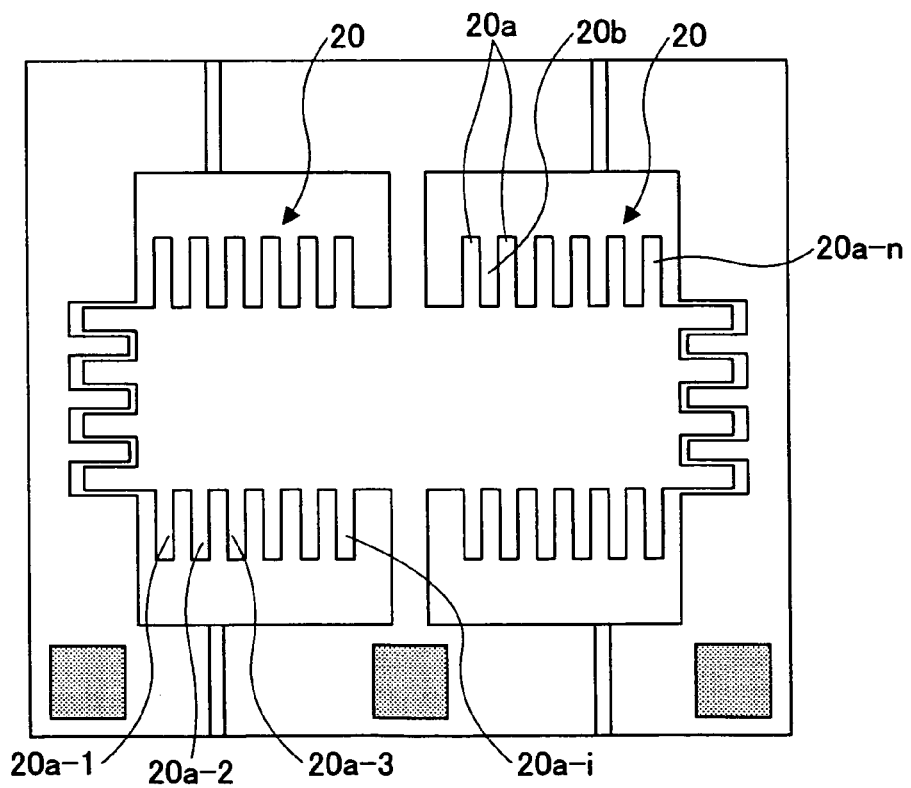
FIG. 12B is a plan view of the optical scanner element shown in FIG. 12A.

FIG. 12A is a perspective view of an optical scanner element according to a first embodiment of the present invention. FIG. 12B is a plan view of the optical scanner element shown in FIG. 12A. In FIGS. 12A and 12B, parts that are the same as the parts shown in FIG. 1A are given the same reference numerals.

The optical scanner element 30 according to the first embodiment of the present invention comprises a substrate 2, which is formed by a dual layer substrate of SOI that is formed of two sheets of conductive silicon substrates 200 and 201 being applied to each other via an insulative silicon oxide film 202. A mirror 1 as a movable plate is supported by elastic members (torsion bars) 3 which serve as beam parts provided along a straight line. Movable electrodes 8 are provided in the mirror 1. Stationary electrodes 9 are provided in a frame part 5 so as to face the movable electrodes 8, respectively. The movable electrodes 8 and the stationary electrodes 9 are separated from each other by separation grooves 6.

Bonding pads 4 for the stationary electrode 9 and bonding pads 7 for the movable electrodes 8 are connected to the stationary electrodes 9 and the movable electrodes 8, respectively, via the conductive silicon substrate 200. The optical scanner 30 causes the micro mirror 1 to reciprocally swing using the two elastic members 3 as a torsional rotation axis according to an electrostatic attraction force between the movable electrodes 8 and the stationary electrodes 9.

In the present embodiment, concavo-convex parts 20 are formed as a moment of inertia adjusting mechanism on sides of the mirror 1. The concavo-convex parts 20 includes a plurality of teeth 20a separated by slots 20b.

A description will be given of a method of forming the optical scanner element 30 according to the present embodiment. The method comprises: forming a resist film on one side of the dual layer substrate of SOI using spin coating; thereafter, developing and fixing the resist film by using a photo mask to form the frame part 5, the micro mirror 1, the elastic members or torsion bars (beam parts) 3, the movable electrodes 8, the stationary electrodes 9, the concavo-convex parts 20 and the separation grooves 6 according to a photolithography; and etching the pattern to the silicon oxide film according to a dry-etching method using the patternized resist film.

Subsequently, a resist film is formed on an opposite side of the SOI substrate in the same manner, the resist film is patternized using a photo mask to left the frame part 5 and the stationary electrodes 9, and, thereafter, parts excluding the frame part 5 and the stationary electrodes 9 are etched to the surface of the silicon oxide film surface. Thereafter, the exposed parts of the silicon oxide film are removed by etching and the bonding pads (electrodes) 4 and 7 are formed in predetermined positions.

When forming the pattern of the mirror 1 by dry-etching, there is a process error in which actual shape and size vary from the designed shape and size, as mentioned before. Accordingly, both a spring constant K of the beam parts 3 and a moment of inertial of the mirror 1 may differ from the design values or target values.

In order to eliminate such a problem, in the first embodiment of the present invention, the concavo-convex parts 20 are provided in the mirror 1, which serves as a moment of inertia adjusting mechanism to adjust an amount of inertia of the mirror 1. That is, if over-etching or under etching occurs when processing the mirror 1, a ratio of the spring constant of the beam parts 3 and the moment of inertia of the mirror 1 does not change, thereby maintaining the resonance frequency of the mirror 1 unchanged. Specifically, for example, if over-etching occurs and the width of each of the beam parts 3 is decreased, the spring constant of the beam parts 3 is decreased from a design value K by a value $\Delta K$. In such a case, the size of the entire mirror 1 is also reduced due to the over-etching, which results in a decrease in the moment of inertia of the mirror 1 from a design value I by a value $I(\Delta K/K)$. Thus, the ratio of the spring constant K to the moment of inertia I becomes $K/I=(K+\Delta K)/(I+\Delta I)$. That is, if the spring constant K is decreased by $\Delta K$, the moment of inertial I is also decreased by $\Delta K$, and, thereby, the ratio of the spring constant of the beam parts 3 to the moment of inertia of the mirror 1 does not change. Accordingly, the resonance frequency of the mirror 1 does not change since the ratio of the spring constant of the beam parts 3 to the moment of inertia of the mirror 1 does not change. Similarly, in a case where under-etching occurs, the width of each beam parts 3 is increased and the size of the entire mirror 1 is increased contrary to the case of over-etching according to the effect of the moment of inertia adjusting mechanism.

Thus, the ratio of the spring constant to the moment of inertia does not change, and, thereby, the resonance frequency does not change.

The concavo-convex parts 20 include a plurality of teeth 20a-1, 20a-2, ..., 20a-i, ..., 20a-n as shown in FIG. 12B so that a fluctuation in the moment of inertia of the mirror 1 as a whole including the plurality of teeth 20a-1 to 20a-n becomes $(\Delta K/K) \times I$, where moments of inertia of the teeth are I1, I2, ..., In, and amounts of variation of the moments of inertia are $\Delta$I1, $\Delta$I2, ..., $\Delta$In.

As an example, a fluctuation in the resonance frequency was investigated by preparing an optical scanner element. The designed mirror had a whole peripheral length of about 245500 µm, a weight of 1.5 mg, a total area of 0.67 mm$^3$, an amount of inertia of $2.98 \times 10^{-5}$ kgf·s$^2$/cm, a length of beam of 1950 µm, and a width of beam of 94 µm. The target design value of the spring constant of the beam was 29449 kgf·cm/rad, and the target design moment of inertia was 5000 Hz. When the mirror was over-etched and the size was reduced entirely by 2 µm, the moment of inertia was $2.64 \times 10^{-5}$ (kgf·s$^2$/cm) and the spring constant was 26160 (kgf·cm/rad). The ratio of the design value of the spring constant to the design value of the moment of inertia was 985587450 (K/I=985587450) while the ratio of the spring constant to the moment of inertia of the over-etched mirror was 9885551250 (K/I=988551250), which are almost equal to each other.

Figure 13:
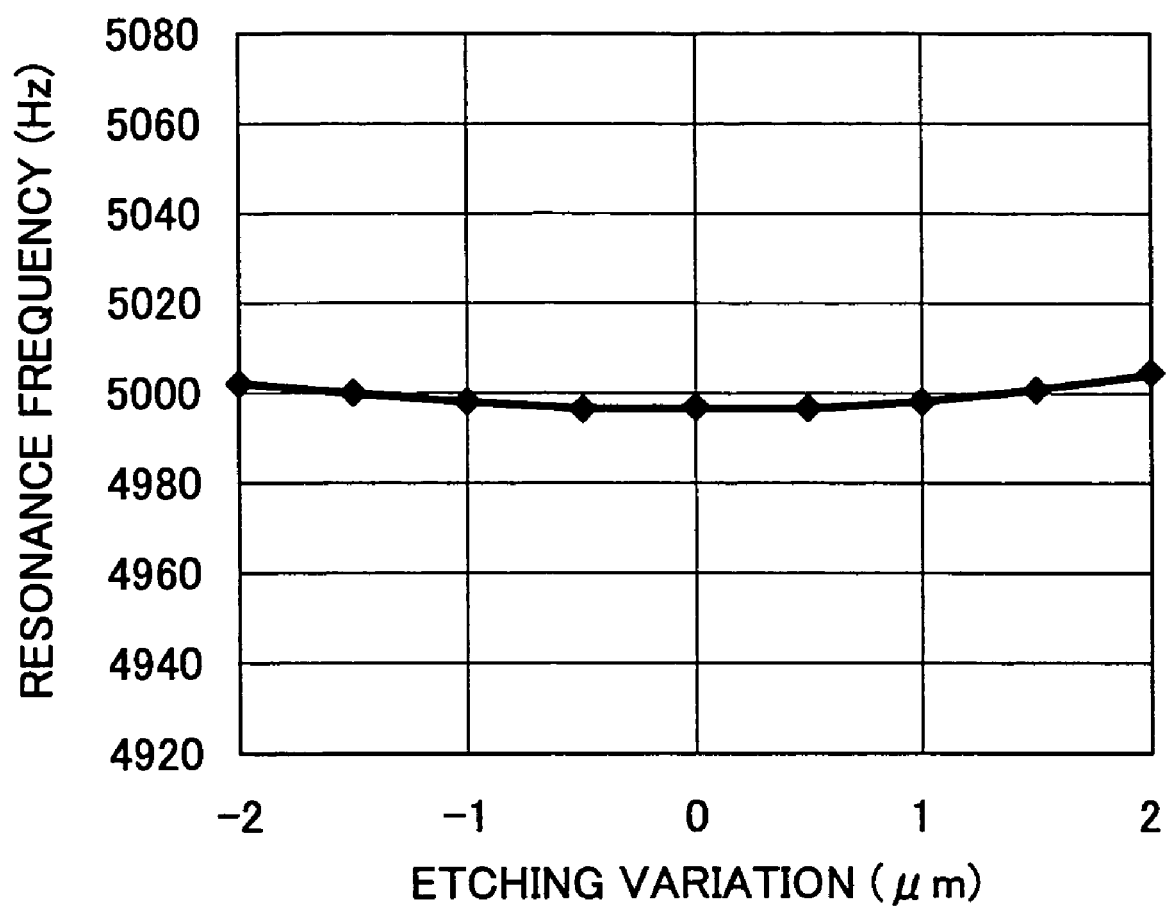
FIG. 13 is a graph showing a variation in a resonance frequency when a size of an etched mirror varies in a range of ±2 μm.

The design value of the resonance frequency of the mirror was 4996 Hz, while resonance frequency of the processed mirror (over-etched mirror) was 5004 Hz. There was only a slight change in the resonance frequency. FIG. 13 is a graph showing a variation in the resonance frequency when the size of the etched mirror varies in a range of ±2 µm. As shown in FIG. 13, the variation in the resonance frequency is within a small range.

Figure 14:
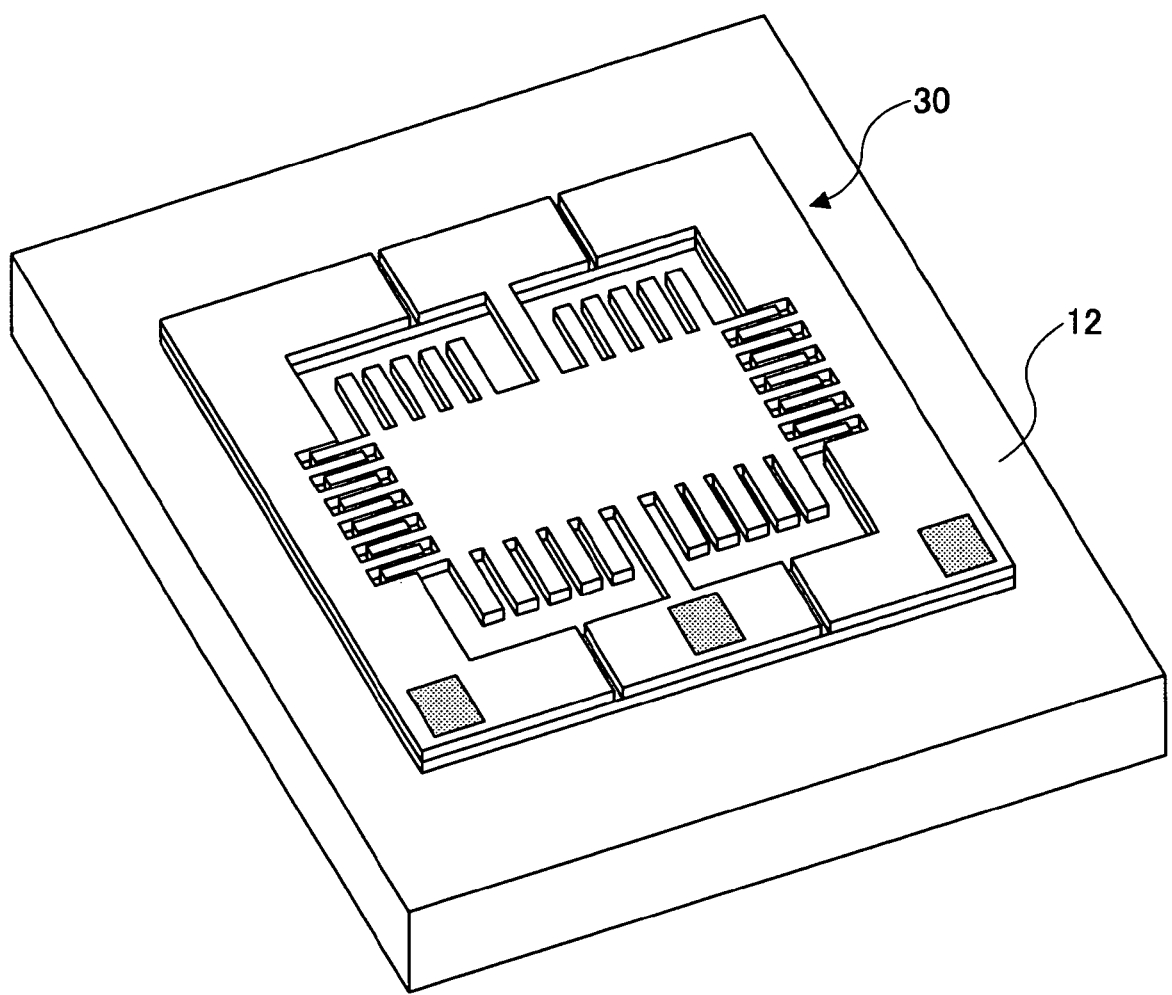
FIG. 14 is a perspective view of the optical scanner element mounted to a stem 12.

FIG. 14 is a perspective view of the optical scanner element 30 mounted to a stem 12. Using the thus-formed optical scanner element 30 (micro mirror) provides a scanner having a small variation in quality without using a costly adjusting process.

Second Embodiment

Figure 15A:
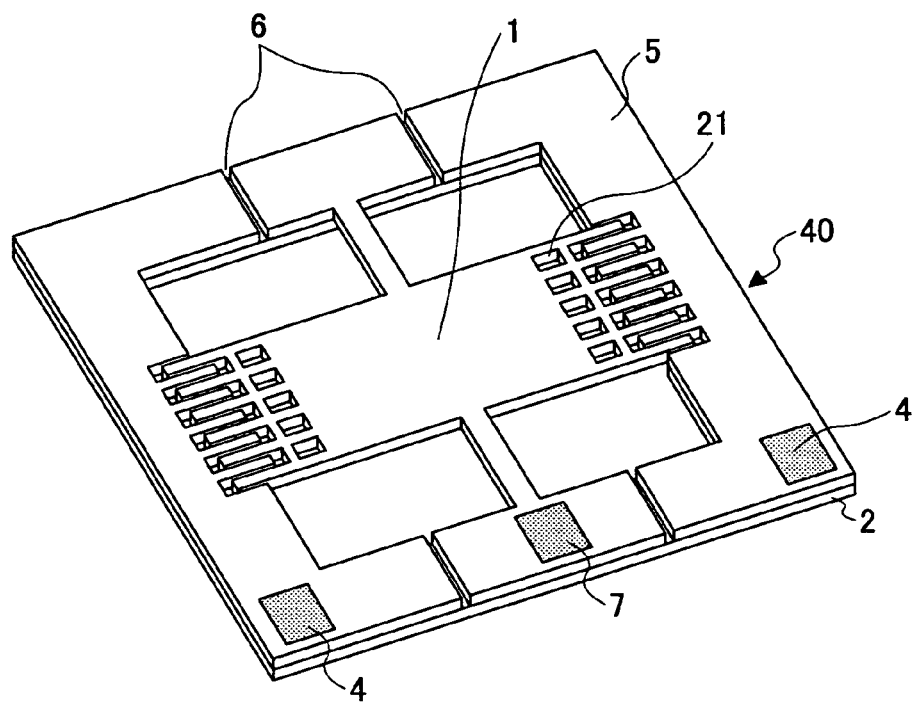
FIG. 15A is a perspective view of an optical scanner element according to a second embodiment of the present invention.
Figure 15B:
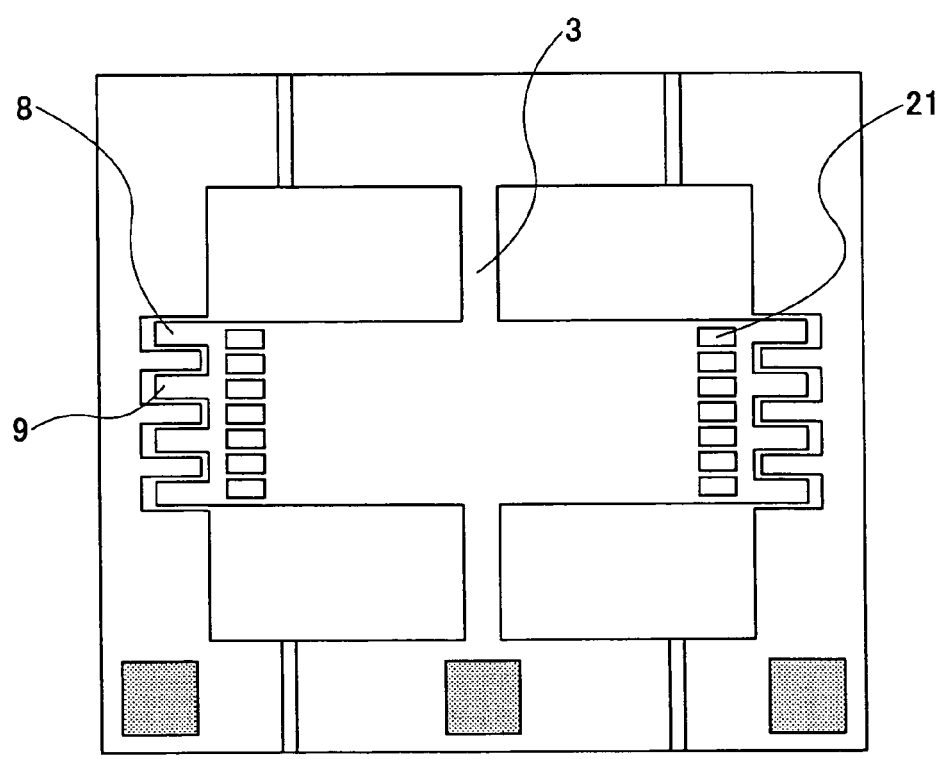
FIG. 15B is a plan view of the optical scanner element shown in FIG. 15A.

FIG. 15A is a perspective view of an optical scanner element 40 according to a second embodiment of the present invention. FIG. 15B is a plan view of the optical scanner element shown in FIG. 15A. In FIGS. 15A and 15B, parts that are the same as the part shown in FIGS. 12A and 12B are given the same reference numerals. The optical scanner element 40 has the same structure as the optical scanner element 30 sown in FIGS. 12A and 12B except for the mirror.

In the present embodiment, a plurality of rectangular-shaped through openings 21 are formed as a moment of inertia adjusting mechanism in the mirror 1 (inside the movable plate).

A description will be given of a method of forming the optical scanner element 40 according to the present embodiment. The method comprises: forming a resist film on one side of the dual layer substrate of SOI using spin coating; thereafter, developing and fixing the resist film by using a photo mask to form the frame part 5, the micro mirror 1, the elastic members (beam parts) 3, the movable electrodes 8, the stationary electrodes 9, the rectangular-shaped through openings 21 and the separation grooves 6 according to a photolithography; and etching the pattern to the silicon oxide film according to a dry-etching method using the patternized resist film.

Subsequently, a resist film is formed on an opposite side of the SOI substrate in the same manner, the resist film is patternized using a photo mask to left the frame part 5 and the stationary electrodes 9, and, thereafter, parts excluding the frame part 5 and the stationary electrodes 9 are etched to the surface of the silicon oxide film surface. Thereafter, the exposed parts of the silicon oxide film are removed by etching and the bonding pads (electrodes) 4 and 7 are formed in predetermined positions.

When forming the pattern of the mirror 1 by dry-etching, there is a process error in which actual shape and size vary from the designed shape and size, as mentioned before. Accordingly, both a spring constant K of the beam parts 3 and a moment of inertial of the mirror 1 may differ from the design values or target values.

In order to eliminate such a problem, in the second embodiment of the present invention, the through openings 21 are provided in the mirror 1, which serve as a moment of inertia adjusting mechanism to adjust an amount of inertia of the mirror 1. That is, if over-etching or under etching occurs when processing the mirror 1, a ratio of the spring constant of the beam parts 3 and the moment of inertia of the mirror 1 does not change, thereby maintaining the resonance frequency of the mirror 1 unchanged. Specifically, for example, if over-etching occurs and the width of each of the beam parts 3 is decreased, the spring constant of the beam parts 3 is decreased from a design value K by a value $\Delta$K. In such a case, the size of the entire mirror 1 is also reduced due to the over-etching, which results in a decrease in the moment of inertia of the mirror 1 from a design value I by a value $I(\Delta K/K)$. Thus, the ratio of the spring constant K to the moment of inertia I becomes $K/I=(K+\Delta K)/(I+\Delta I)$. That is, if the spring constant K is decreased by $\Delta$K, the moment of inertial I is also decreased by $\Delta$K, and, thereby, the ratio of the spring constant of the beam parts 3 to the moment of inertia of the mirror 1 does not change. Accordingly, the resonance frequency of the mirror 1 does not change since the ratio of the spring constant of the beam parts 3 to the moment of inertia of the mirror 1 does not change. Similarly, in a case where under-etching occurs, the width of each beam parts 3 is increased and the size of the entire mirror 1 is increased contrary to the case of over-etching according to the effect of the moment of inertia adjusting mechanism. Thus, the ratio of the spring constant to the moment of inertia does not change, and, thereby, the resonance frequency does not change.

In order to eliminate such a problem, in the second embodiment of the present invention, the through openings 21 are provided in the mirror 1, which serves as a moment of inertia adjusting mechanism to adjust an amount of inertia of the mirror 1. That is, if over-etching or under etching occurs when processing the mirror 1, a ratio of the spring constant of the beam parts 3 and the moment of inertia of the mirror 1 does not change, thereby maintaining the resonance frequency of the mirror 1 unchanged. Specifically, for example, if over-etching occurs and the width of each of the beam parts 3 is decreased, the spring constant of the beam parts 3 is decreased from a design value K by a value $\Delta$K. In such a case, the size of the entire mirror 1 is also reduced due to the over-etching, which results in a decrease in the moment of inertia of the mirror 1 from a design value I by a value $I(\Delta K/K)$. Thus, the ratio of the spring constant K to the moment of inertia I becomes $K/I=(K+\Delta K)/(I+\Delta I)$. That is, if the spring constant K is decreased by $\Delta$K, the moment of inertial I is also decreased by ΔK, and, thereby, the ratio of the spring constant of the beam parts 3 to the moment of inertia of the mirror 1 does not change. Accordingly, the resonance frequency of the mirror 1 does not change since the ratio of the spring constant of the beam parts 3 to the moment of inertia of the mirror 1 does not change. Similarly, in a case where under-etching occurs, the width of each beam parts 3 is increased and the size of the entire mirror 1 is increased contrary to the case of over-etching according to the effect of the moment of inertia adjusting mechanism. Thus, the ratio of the spring constant to the moment of inertia does not change, and, thereby, the resonance frequency does not change.

As mentioned above, by providing many through openings 21 in a part of the mirror 1, which is not used as a mirror, an influence of a variation in processing the mirror can be reduced. Using the thus-formed optical scanner element 40 (micro mirror) provides a scanner having a small variation in quality without using a costly adjusting process.

Third Embodiment

Figure 16A:
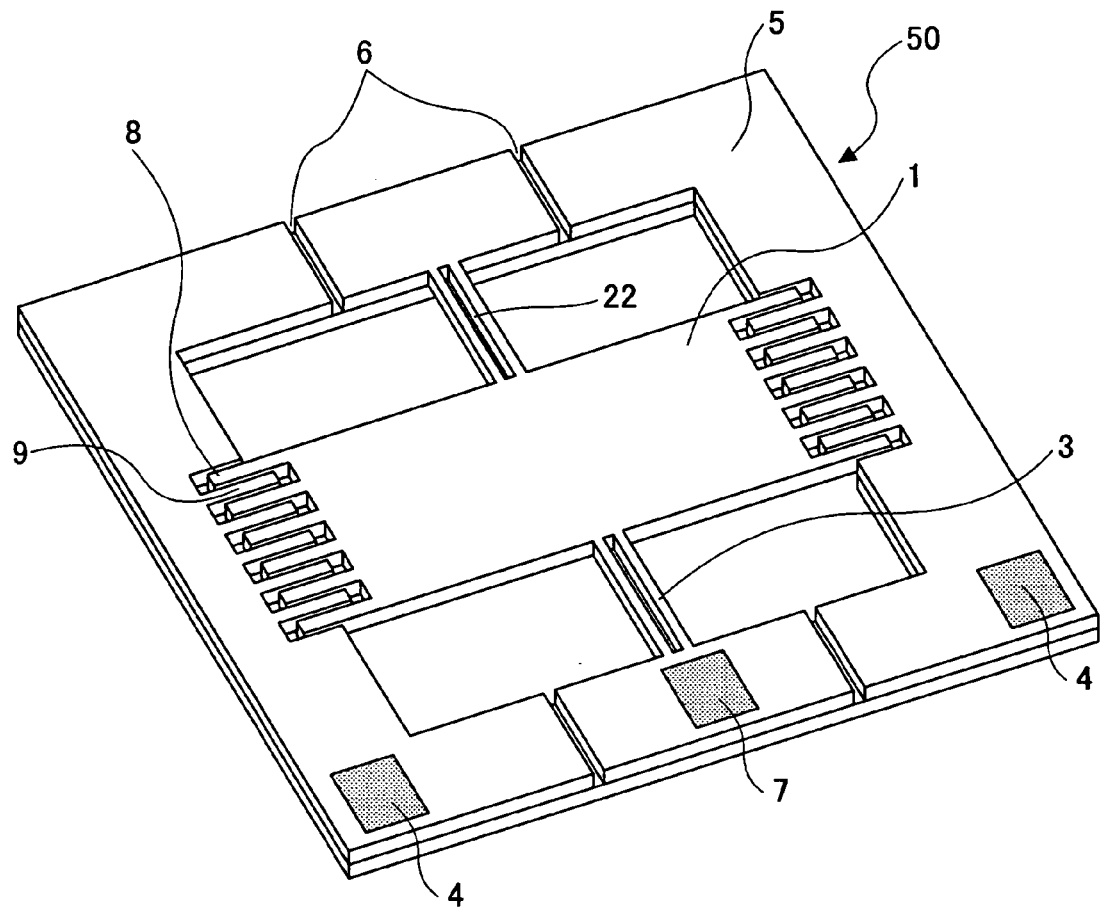
FIG. 16A is a perspective view of an optical scanner element according to a third embodiment of the present invention.
Figure 16B:
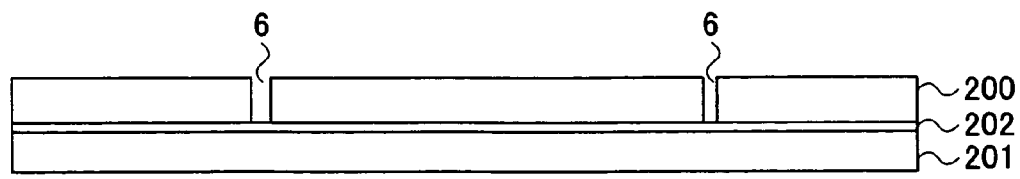
FIG. 16B is a side view of the optical scanner element shown in FIG. 16A.
Figure 16C:
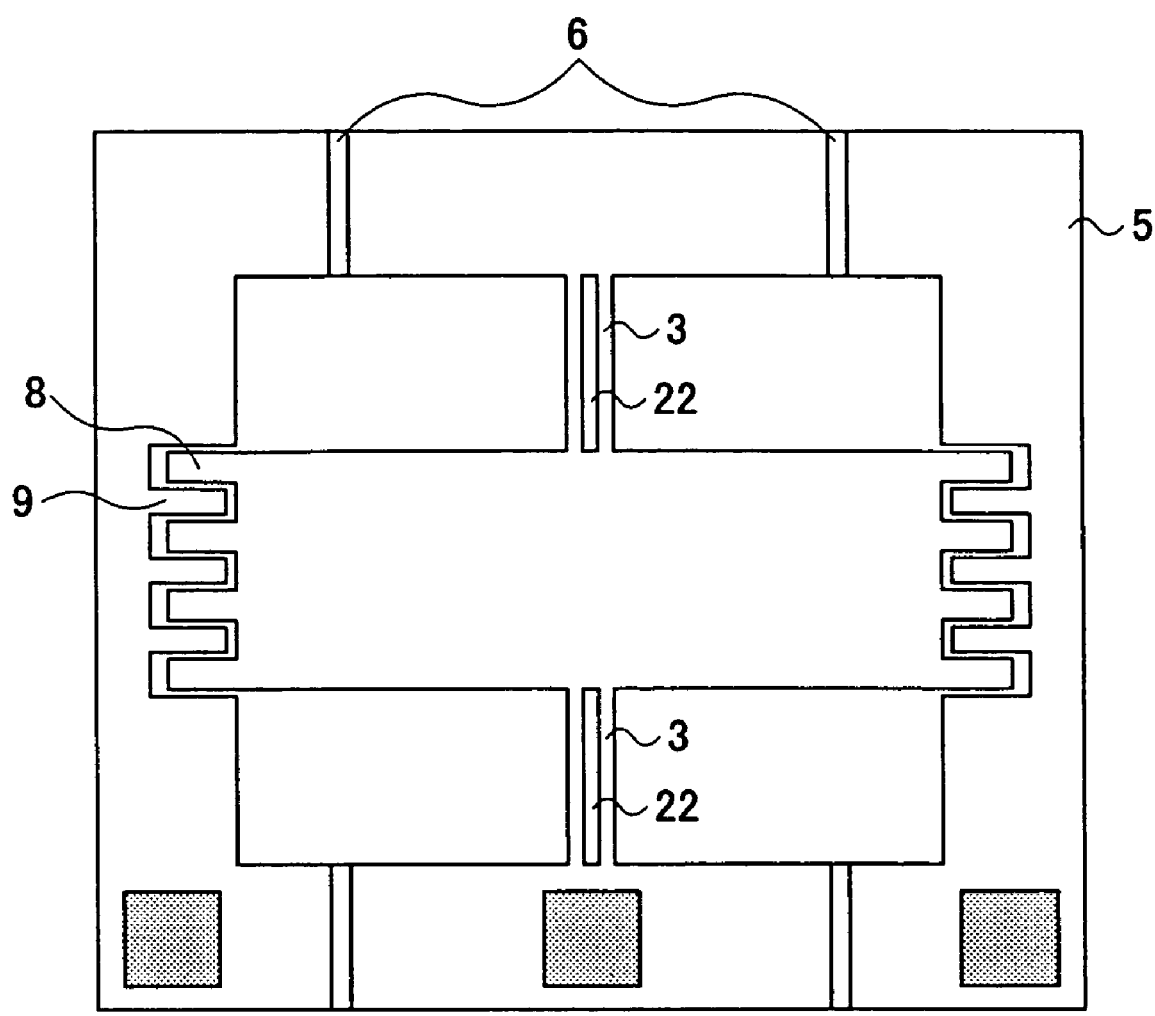
FIG. 16C is a plan view of the optical scanner element shown in FIG. 16A.

FIG. 16A is a perspective view of an optical scanner element 50 according to a third embodiment of the present invention. FIG. 16B is a side view of the optical scanner element 50 shown in FIG. 16A. FIG. 16C is a plan view of the optical scanner element shown in FIG. 16A. In FIGS. 16A, 16B and 16C, parts that are the same as the part shown in FIGS. 12A and 12B are given the same reference numerals. The optical scanner element 50 has the same structure as the optical scanner element 30 sown in FIGS. 12A and 12B except for the mirror.

In the present embodiment, a rectangular-shaped through opening 22 is formed as a spring constant adjusting mechanism in each of the beam parts 3.

A description will be given of a method of forming the optical scanner element 50 according to the present embodiment. The method comprises: forming a resist film on one side of the dual layer substrate of SOI using spin coating; thereafter, developing and fixing the resist film by using a photo mask to form the frame part 5, the micro mirror 1, the elastic members (beam parts) 3, the movable electrodes 8, the stationary electrodes 9, the rectangular-shaped through openings 22 and the separation grooves 6 according to a photolithography; and etching the pattern to the silicon oxide film according to a dry-etching method using the patternized resist film.

Subsequently, a resist film is formed on an opposite side of the SOI substrate in the same manner, the resist film is patternized using a photo mask to left the frame part 5 and the stationary electrodes 9, and, thereafter, parts excluding the frame part 5 and the stationary electrodes 9 are etched to the surface of the silicon oxide film surface. Thereafter, the exposed parts of the silicon oxide film are removed by etching and the bonding pads (electrodes) 4 and 7 are formed in predetermined positions.

When forming the pattern of the mirror 1 by dry-etching, there is a process error in which actual shape and size vary from the designed shape and size, as mentioned before. Accordingly, both a spring constant K of the beam parts 3 and a moment of inertial of the mirror 1 may differ from the design values or target values.

In order to eliminate such a problem, in the third embodiment of the present invention, the through openings 22 are provided in the mirror 1, which serves as a spring constant adjusting mechanism to adjust a variation of the spring constant of the beam parts 3. That is, if over-etching or under-etching occurs when processing the mirror 1, a ratio of the spring constant of the beam parts 3 and the moment of inertia of the mirror 1 does not change, thereby maintaining the resonance frequency of the mirror 1 unchanged. Specifically, for example, if over-etching occurs, an area of the mirror 1 is reduced and a moment of inertia is decreased from a design value I by ΔI, but the width of each of the beam parts 3 is also reduced and the spring constant K is decreased from a design value by ΔK due to the spring constant adjusting mechanism. In such a case, the spring constant K of the beam parts 3 is reduced due to the over-etching, which results in a decrease in the spring constant of the beam parts 3 from the design value K by a value K(ΔI/I). Thus, the ratio of the spring constant K to the moment of inertia I becomes K/I=(K+ΔK)/(I+ΔI). That is, if the moment of inertial I is decreased by ΔK, the spring constant K is also decreased by ΔK, and, thereby, the ratio of the spring constant of the beam parts 3 to the moment of inertia of the mirror 1 does not change. Accordingly, the resonance frequency of the mirror 1 does not change since the ratio of the spring constant of the beam parts 3 to the moment of inertia of the mirror 1 does not change. Similarly, in a case where under-etching occurs, the size of the entire mirror 1 is increased but the width of each beam parts 3 is also increased contrary to the case of over-etching according to the effect of the spring constant adjusting mechanism. Thus, the ratio of the spring constant to the moment of inertia does not change, and, thereby, the resonance frequency does not change.

As mentioned above, by providing the through opening 22 in a part of each of the beam parts 3, which is not used as a mirror, an influence of a variation in processing the mirror can be reduced. Using the thus-formed optical scanner element 50 (micro mirror) provides an optical scanner element having a small variation in quality without using a costly adjusting process.

Figure 4:
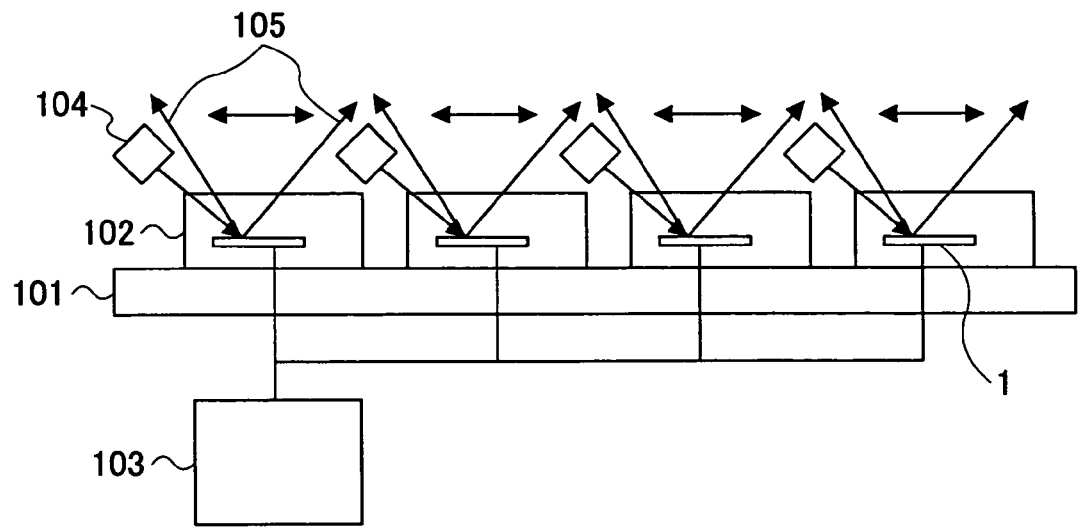
FIG. 4 is an illustration of an optical scanning apparatus provided with a plurality of optical scanners.
Figure 5:
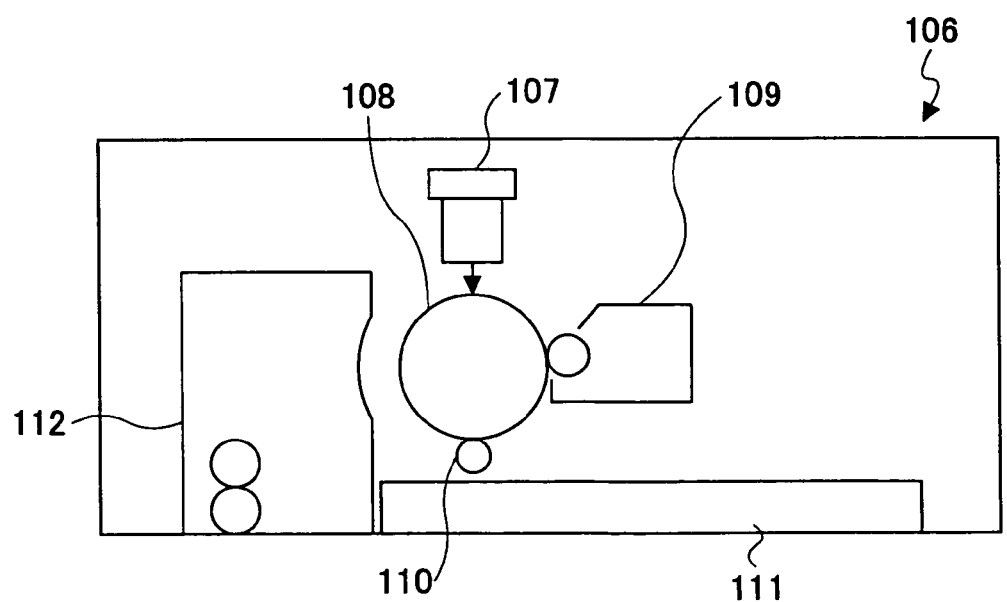
FIG. 5 is an illustration of a laser printer as an example of an image forming apparatus.
Figure 6:
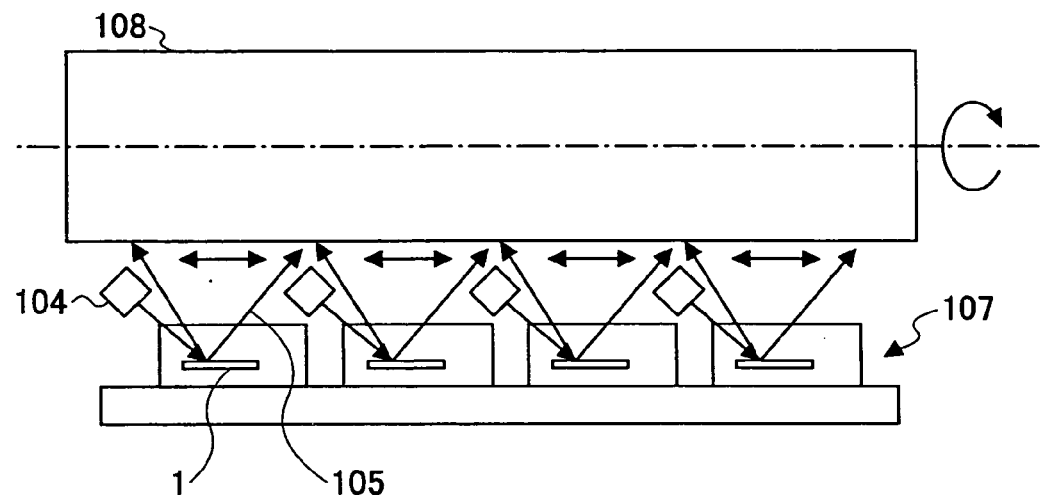
FIG. 6 is an illustration of the optical scanning apparatus and the photoconductor 108 shown in FIG. 5.
Figure 7:
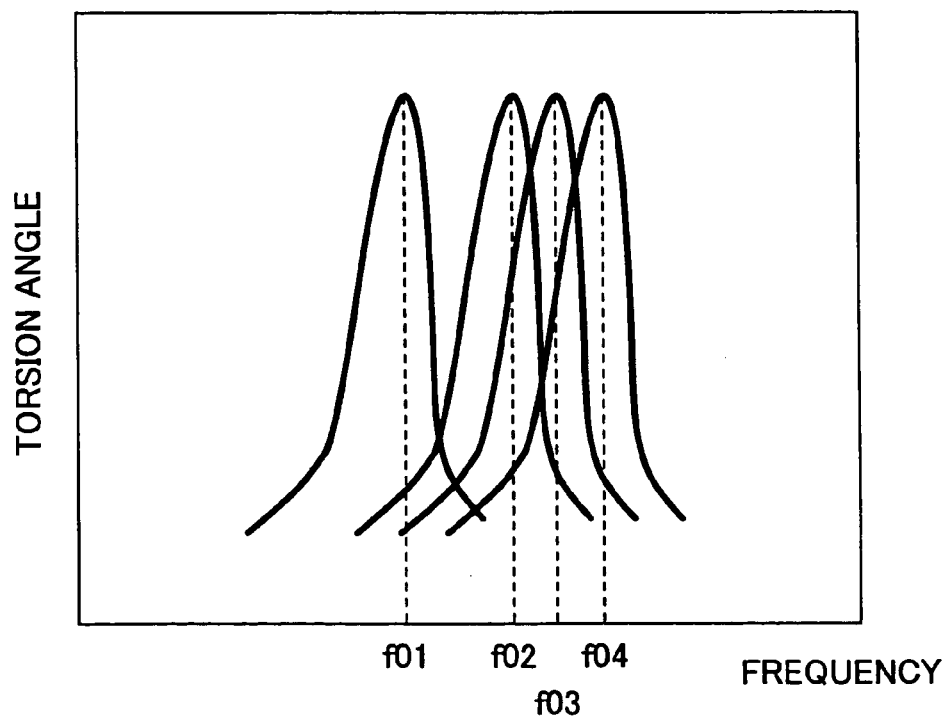
FIG. 7 is a graph showing results of a resonance frequency of each optical scanner.
Figure 8A:
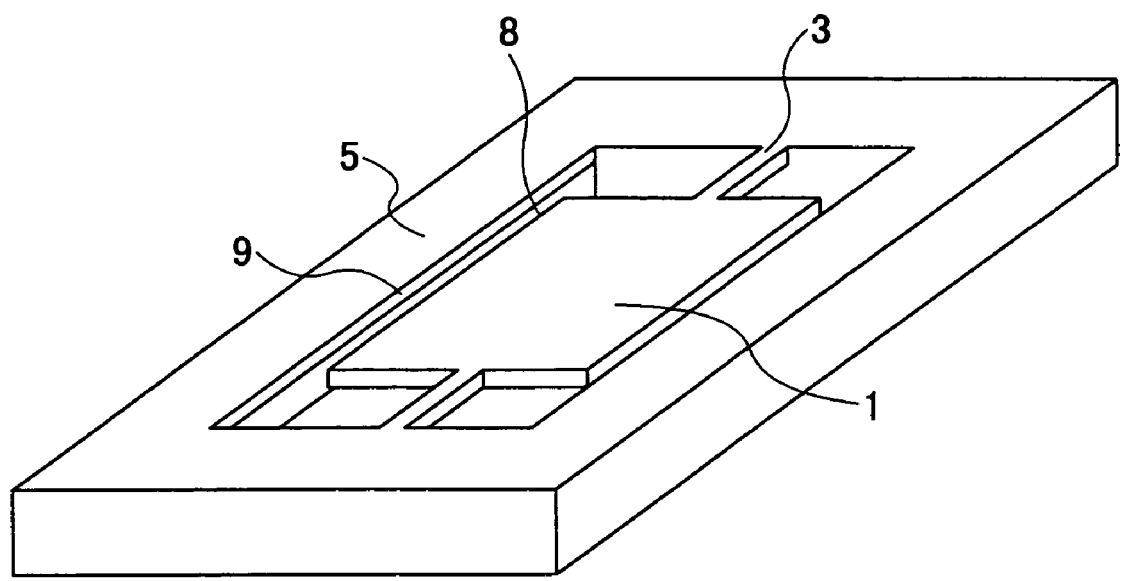
FIG. 8A is a perspective view of an optical scanner of which structure is simplified for the sake of easy description of the resonance frequency of the optical scanner.
Figure 8B:
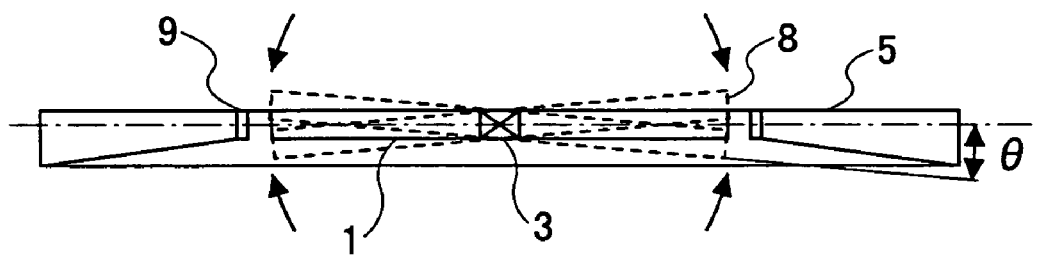
FIG. 8B is a cross-sectional view of the optical scanner shown in FIG. 8A.
Figure 9:
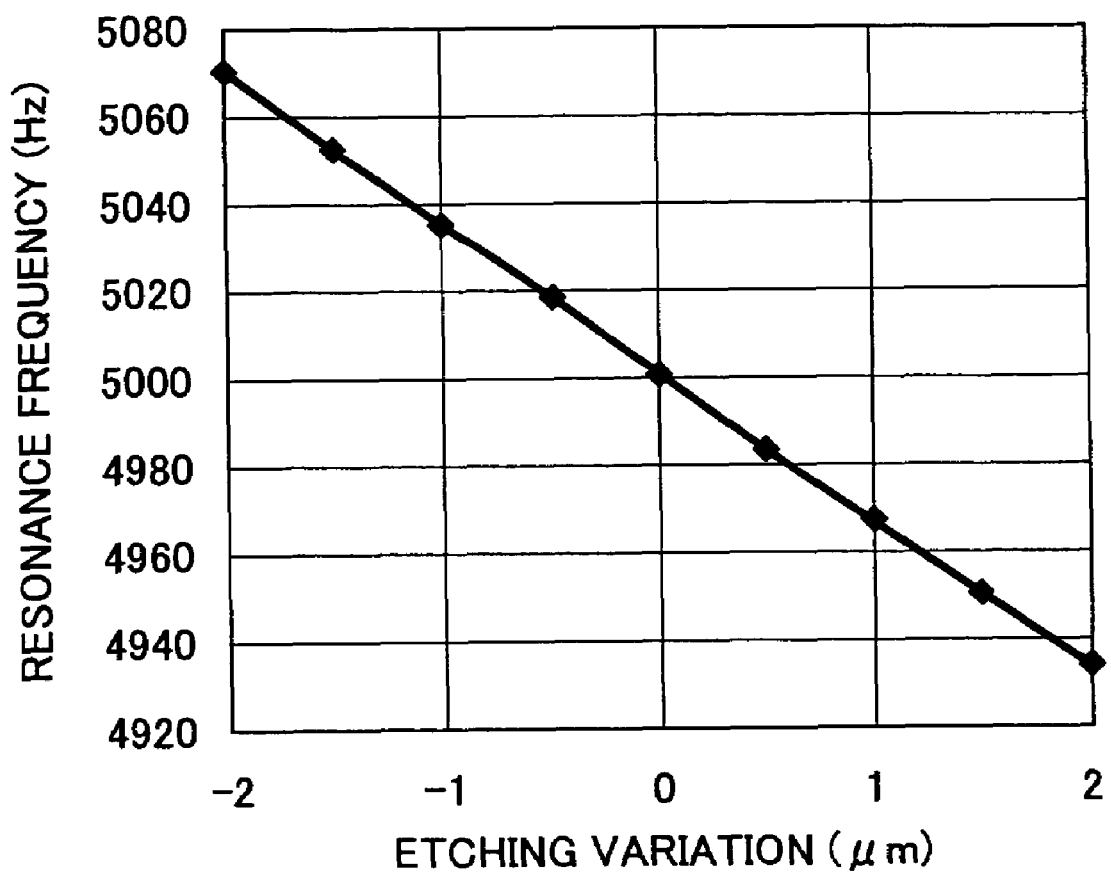
FIG. 9 is a graph showing a relationship between a variation in etching and a resonance frequency.
Figure 10:
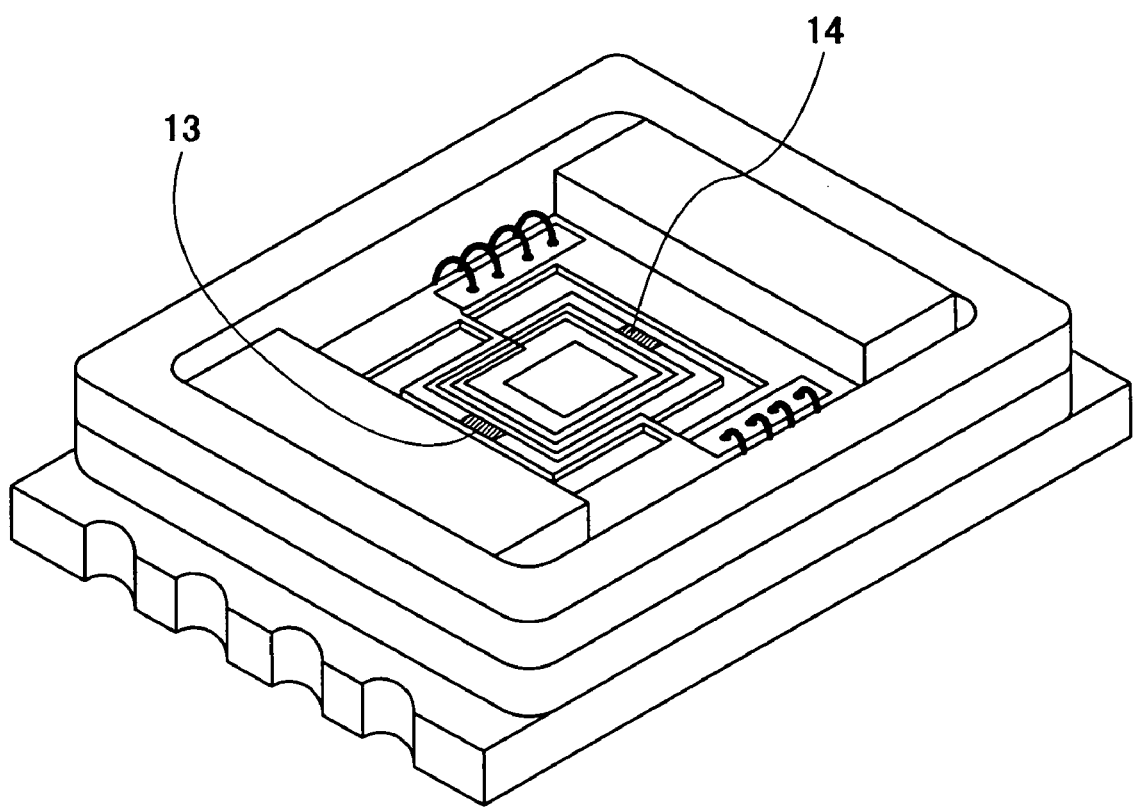
FIG. 10 is a perspective view of an optical scanner which is capable of adjusting a resonance frequency thereof according to a first method.
Figure 11:
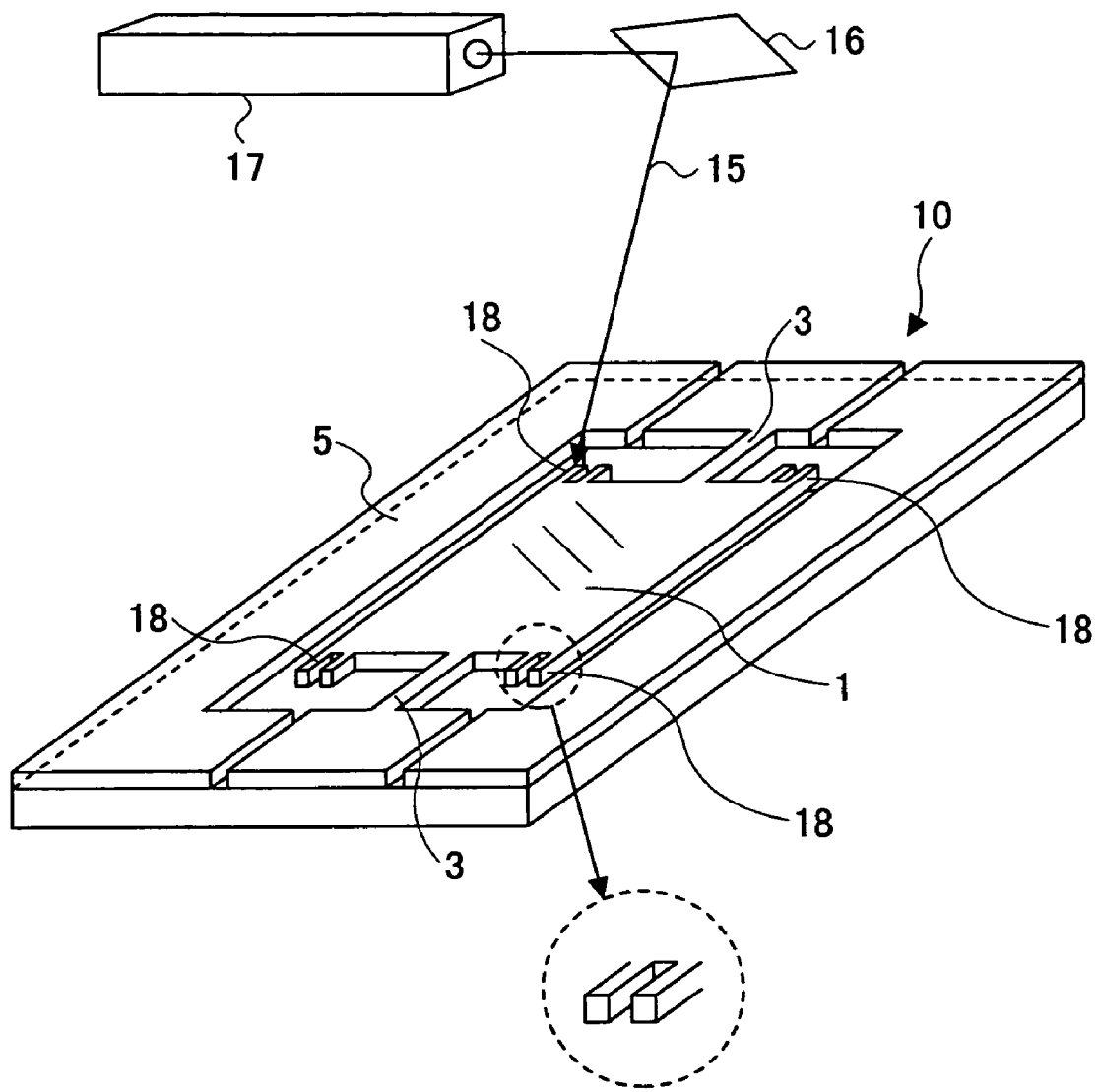
FIG. 11 is a perspective view of an optical scanner showing a second method of adjusting a resonance frequency.

Using the optical scanner element according to the above-mentioned first, second or third embodiment, an optical scanning apparatus such as shown in FIG. 4 can be constituted. Additionally, using such an optical scanning apparatus, an image forming apparatus such as shown in FIGS. 5 and 6 can be constituted.

As mentioned above, according to the present invention, a variation in a resonance frequency of a mirror due to a variation in processing accuracy of members of an optical scanner element, which deflects an irradiated light from a light source by reciprocally swinging a mirror by twisting elastic members as a rotational axis, can be suppressed. Thus, an optical scanning apparatus having a mirror of which swing angle is constant can be provided without a costly adjusting process (that is, a structure is used which does not need adjustments of ΔK and ΔI). Further, an image forming apparatus can be provided, which has the above-mentioned optical scanning apparatus so that there is no variation occurs in a swing angle between adjacent optical scanner elements, thereby achieving an image formation with a good quality.

The present invention is not limited to the specifically disclosed embodiments, and variations and modifications may be made without departing from the scope of the present invention.

The present application is based on Japanese priority applications No. 2004-340129 filed Nov. 25, 2004 and No. 2005-269244 filed Sep. 15, 2005, the entire contents of which are hereby incorporated herein by reference.

What is claimed is:

1. A scanner element comprising:

a frame part formed by a substrate;

a movable plate formed inside the frame part; and a torsion bar swingably supporting the movable plate on the frame part, wherein one of said movable plate and said torsion bar has an adjusting part formed by a process of forming said movable plate and said torsion bar so that a ratio of an actual value of a moment of inertia $I+\Delta I$ of said movable plate to an actual value of a spring constant $K+\Delta K$ of said torsion bar is substantially equal to a ratio of a design value of the moment of inertia I of said movable plate to a design value of the spring constant K of said torsion bar.

2. The scanner element as claimed in claim 1, wherein said adjusting part is formed in said movable plate so as to serve as a moment of inertia adjusting mechanism that adjusts the amount of change $\Delta I$ in the moment of inertia I, when an amount of processing the substrate to form said movable plate and said torsion bar varies, so that the amount of change $\Delta I$ in the moment of inertia I is equal to $(\Delta K/K)I$ when the design value of the spring constant K of said torsion bar changes by the amount of change $\Delta K$ due to a variation in the amount of the processing.

3. The scanner element as claimed in claim 2, wherein the moment of inertia adjusting mechanism includes a plurality of structural elements located at positions in a part other than parts providing a function of said movable plate so that the moment of inertia of said movable plate changes in response to a variation in an amount of processing of said movable plate.

4. The scanner element as claimed in claim 3, wherein n pieces of the structural elements are provided in or near said movable plate, and an amount of change of a moment of inertia of each of said structural elements in the processing step of the structural elements is $\Delta I(i)$, where i is an integer from 1 through n so that a relationship $\Delta I(1)+\Delta I(2)+ \ldots +\Delta I(n)=(\Delta K/K)I$ is satisfied.

5. The scanner element as claimed in claim 1, wherein said adjusting part is formed in said torsion bar so as to serve as a spring constant adjusting mechanism that adjusts the amount of change $\Delta K$ in the spring constant K of said torsion bar when an amount of processing to from said movable plate and said torsion bar varies, so that the amount of change $\Delta K$ in the spring constant K is equal to $(\Delta I/I)K$ when a designed value of the moment of inertia I of said movable plate changes by the amount of change $\Delta I$ due to a variation in the amount of the processing.

6. The scanner element as claimed in claim 1, wherein said movable plate and said torsion bar are processed by the same processing step.

7. The scanner element as claimed in claim 6, wherein said processing step is an etching process.

8. The scanner element as claimed in claim 1, wherein the amount of change $\Delta I$ of the moment of inertia I of said movable plate corresponds to a tolerance of the amount of processing said movable plate due to over-etching or under-etching.

9. The scanner element as claimed in claim 1, wherein the amount of change $\Delta K$ of the spring constant K of said torsion bar corresponds to a tolerance of the amount of processing said torsion bar due to over-etching or under-etching.

10. The scanner element as claimed in claim 2, wherein said moment of inertia adjusting mechanism includes a concavo-convex shape provided on a periphery of said movable plate.

11. The scanner element as claimed in claim 2, wherein said moment of inertia adjusting mechanism includes a recess or a through opening provided in said movable plate.

12. The scanner element as claimed in claim 6, wherein said movable plate has a concavo-convex shape on a periphery thereof.

13. The scanner element as claimed in claim 6, wherein said movable plate has a recess or a through opening provided inside thereof.

14. An optical scanning apparatus comprising:

a light source; and a scanner element that scans a light emitted by said light source, wherein the scanner element includes:

a frame part formed by a substrate;

a movable plate formed inside the frame part; and a torsion bar swingably supporting the movable plate on the frame part, wherein one of said movable plate and said torsion bar has an adjusting part formed by a process of forming said movable plate and said torsion bar so that a ratio of an actual value of a moment of inertia $I+\Delta I$ of said movable plate to an actual value of a spring constant $K+\Delta K$ of said torsion bar is substantially equal to a ratio of a design value of the moment of inertia I of said movable plate to a design value of the spring constant K of said torsion bar.

15. An image forming apparatus comprising:

an optical scanning apparatus that scans a light;

a photo conductor that forms an electrostatic latent image thereon according to the light from said optical scanning apparatus; and a developer that develops the electrostatic latent image by a toner to form a toner image; and a transfer unit that transfer the toner image onto a recording medium, wherein said optical scanning apparatus includes:

a light source; and a scanner element that scans a light emitted by said light source, the scanner element including:

a frame part formed by a substrate;

a movable plate formed inside the frame part; and a torsion bar swingably supporting the movable plate on the frame part, wherein one of said movable plate and said torsion bar has an adjusting part formed by a process of forming said movable plate and said torsion bar so that a ratio of an actual value of a moment of inertia $I+\Delta I$ of said movable plate to an actual value of a spring constant $K+\Delta K$ of said torsion bar is substantially equal to a ratio of a design value of the moment of inertia I of said movable plate to a design value of the spring constant K of said torsion bar.

16. An image forming apparatus as claimed in claim 15, wherein a plurality of said optical scanning apparatuses are provided, and wherein the amount of change $\Delta I$ of the moment of inertia I of said movable plate corresponds to a tolerance of the amount of processing said movable plate due to over-etching or under-etching.

* * * * *